United States Patent
Rinke et al.

[11] Patent Number: 5,903,346
[45] Date of Patent: May 11, 1999

[54] ANALYSIS SYSTEM

[75] Inventors: Günter Rinke, Weingarten; Christian Hartig, Eggenstein-Leopoldshafen, both of Germany

[73] Assignee: Forschungszentrum Karlsruhe GmbH, Karlsruhe, Germany

[21] Appl. No.: 09/131,787

[22] Filed: Aug. 10, 1998

Related U.S. Application Data

[63] Continuation-in-part of application No. PCT/EP97/01168, Mar. 7, 1997.

[30] Foreign Application Priority Data

Mar. 15, 1996 [DE] Germany .......................... 196 10 168

[51] Int. Cl.$^6$ ........................................... G01J 3/42
[52] U.S. Cl. ........................ 356/320; 356/408; 356/434; 356/448
[58] Field of Search .................... 356/320, 408, 356/434, 448

[56] References Cited

U.S. PATENT DOCUMENTS 4,707,133 11/1987 Roberts et al. .......................... 356/320
4,929,078 5/1990 Harmon .................................. 356/320
5,461,477 10/1995 Marinelli et al. ...................... 356/320

FOREIGN PATENT DOCUMENTS

| | | |
|---|---|---|
| 1 141 094 | 12/1962 | Germany . |
| 4 350 441 | 9/1982 | Germany . |
| 42 15 165 | 6/1993 | Germany . |
| 42 32 371 | 2/1994 | Germany . |
| 57-111422 | 7/1982 | Japan . |
| 59-061758 | 4/1984 | Japan . |

*Primary Examiner*—Frank G. Font
*Assistant Examiner*—Reginald A. Ratliff
*Attorney, Agent, or Firm*—Klaus J. Bach

[57] ABSTRACT

In an analysis system including as light sources an incandescent lamp and a blue light emitting diode, the light of the two sources is combined and directed through filters and a test tube with material to be examined to a photodiode array spectrometer. The filters are so selected that they counteract the intensity drop of the incandescent lamp and the sensitivity decrease of the photodiode array of the spectrometer at short wave lengths.

2 Claims, 7 Drawing Sheets

ANALYSIS SYSTEM

This is a continuation-in-part application of international patent application PCT/EP97/01168 filed Mar. 7, 1997 and claiming the priority of German application 196 10 168.9 of Mar. 15, 1996.

BACKGROUND OF THE INVENTION

The invention resides in an analysis system comprising at least two light sources with a beam splitter for combining the beams of the light sources, an optical cell and a photodiode array spectrometer.

In a spectral photometer, the spectrum emitted from light sources such as incandescent lamps over a certain wave length range as well as the spectral sensitivity of the sensors used for the detection cause excessive signal differences within the spectral range to be covered. An extreme case resides in the use of incandescent lamps together with silicon photodiode arrays: It is well known that the intensity of an incandescent lamp drops strongly toward blue. At the same time, the sensitivity of silicon photodiodes decreases toward the blue. As a result, the dynamic range of the photodiode arrays used as multi-channel detector is not well utilized which results in a noise with spectral dependency. But even more disturbing is the error light at the short wave end of the measuring range since, at this end, the intensity is very low and barely higher than that of the stray light. In the given example, the stray light is particularly pronounced since an incandescent lamp has a relatively high emission in the close infrared range and silicon photo diodes have their greatest sensitivity in the same area. If such a spectrometer system is used for absorption measurements, the absorption spectrum of a gas, a liquid or a solid to be investigated is highly adulterated so that a quantitative concentration determination using the short wave measurement range is not possible.

A solution frequently used to solve this dilemma resides in employing a halogen lamp. Because of the halogen cycling process in effect in halogen lamps, these lamps can be operated at very high filament temperatures which results not only in a high general light output, but also in a relatively high output of light in the blue spectral range. Unfortunately, the life of halogen lamps is limited to about 1500 hours (2 months), which results in relatively high maintenance costs for a process measuring apparatus which is in constant operation, day and night. Also, the life of a halogen lamp can be extended only insignificantly by operating the lamp at lower than design voltage since the voltage operating range is very limited: at much reduced voltage, the filament and glass bulb temperatures become so low that the halogen cycle process does not operate properly and deposits (blackening) form at the inside of the glass bulb.

To compensate for the signal loss in the short wave range of the visible light the following methods are known:

In scanning spectral photometers which include a detector element and a rotating diffraction screen, a second beam path with a second detector is utilized. Depending on the wave length and consequently the signal intensity, the amplifier for the first detector, with photomultipliers, the high voltage is adjusted. In addition, a deuterium lamp is utilized which provides for light of 200 nm to 400 nm wave length.

This solution however has several disadvantages: for one, this concept may be suitable for laboratory equipment but, because of the mechanical structure (rotating screen), not for rough industrial applications. Also disadvantageous is the short incandescent lamp life, since the lamp has to be operated at a relatively high load in order to generate sufficient blue light radiation.

Also, a deuterium lamp has only a relatively short life of about 3 months when operated constantly. In addition, a scanning system, also in the laboratory, has never the good wave length reproducibility which a rigid solid array spectrometer system has. Finally, the deuterium lamp which is needed for such arrangements is extremely expensive.

Array spectrometers with rigid diffraction screen and a multi-channel detector (photodiode array) are more sturdy and have a good wave length reproducibility. The varying signal intensity is at least partially compensated for by the combination of halogen and deuterium lamps.

The main disadvantages are the short lives of both lamps and the costs of the deuterium lamp.

More advantageous are UV array spectrometers which operate with a single light source, that is, a xenon flash light as described in DE Patent 4 232 371 C2.

The only disadvantage of this arrangement resides in the costs for the xenon flashlight and the necessary transfer optical system compensating for the movements of the light-generating arc. These expenses would be justifiable for the UV light range, but not for the visible light range.

It is also possible to arrange a diaphragm directly in front of the photodiode array which includes restrictions to compensate for array elements which have high light intensities or for photodiodes which are very sensitive. A corresponding procedure is described in EP 0 260 013 A3. However, such arrangements requires expensive adjustment devices and generate additional stray light.

From Yair Talmi, publication Applied Optics, volume 19, issue 9, May 1, 1980, pages 1401 ff, it is further known to improve the dynamic range of array spectrometers by periodically changing the integration time of the array. For example the strong signal range can be evaluated with a short integration duration, whereas the weaker signal ranges can be evaluated with longer light collection periods. The time spectrum is obtained with this method by combining the not over-controlled spectral ranges of all the records of different radiation durations.

This procedure, however, has the disadvantage that, on one hand, a complicated electronic system for controlling the arrays is needed and, on the other hand, the dark current changes differently with regard to the spectrum, and the signal-to-noise ratio deteriorates.

It is the object of the present invention to provide an analysis system with an optical light source which, together with an array spectrometer system better utilize the dynamic range of the photodiode array in a simple manner and, as a result, reduces stray light.

SUMMARY OF THE INVENTION

In an analysis system including as light sources an incandescent lamp and a blue light emitting diode, the light of the two sources is combined and directed through filters and a test tube with material to be examined to a photodiode array spectrometer. The filters are so selected that they counteract the intensity drop of the incandescent lamp and the sensitivity decrease of the photodiode array of the spectrometer at short wave lengths.

The optical filters disposed in the beam path, have such a transmission characteristic that they compensate for the decrease in intensity of the measuring signals: the transmission of light increases in the short wave range. In addition, a blue light emitting diode is employed which has a particularly high intensity in this spectral range.

It is also very important that an evacuated or gas-filled lamp is utilized which is operated at a voltage below design voltage. As already mentioned, this is not possible with halogen lamps, but evacuated or gas-filled incandescent lamps can be operated at reduced voltage in order to increase their service life. It is for example possible to extend the life of an incandescent lamp by the factor of 10 if it is operated at 20% below design voltage. In this way, the life span of a typical vacuum lamp which is designed for 3000 hrs of operation can be operated at 20% below design voltage. The resulting relatively low light output in the visible spectral range is acceptable with sensitive optical detectors. The gas-filled lamp has the advantage over a vacuum lamp that, with the same filament temperature, it has a greater life expectancy, since Wolfram atoms thermally emitted from the filament are not deposited on the glass bulb because of the slower diffusion rate through the gas. On the other hand, each gas is heat conductive so that the bulb temperatures of a gas filled lamp is substantially higher than that of an evacuated incandescent lamp. For thermally critical applications, it is therefore better to use a vacuum lamp.

An embodiment of the invention will be described below in greater detail on the basis of the accompanying drawings.

DESCRIPTION OF A PREFERRED EMBODIMENT

Figure 1:
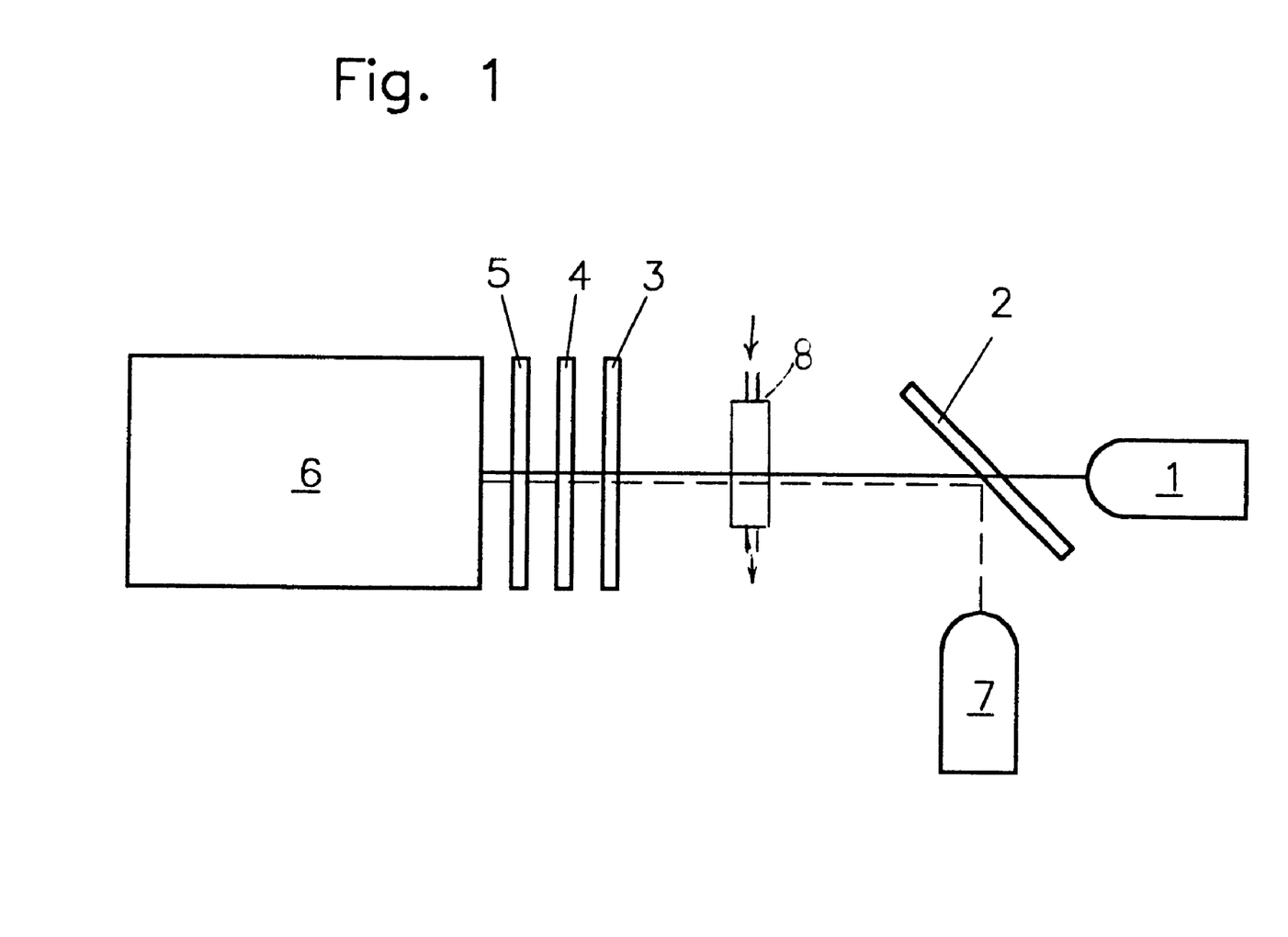
FIG. 1 shows an experimental set up.

FIG. 1 shows schematically the optical arrangement with which all the following testing was done. The beam of an incandescent lamp reaches without any lens system a miniature spectrometer 6 by way of a beam splitter 2 consisting of glass and various filters 3, 4, 5. Such miniature spectrometers are commercially available and consist essentially of an entrance slot, a concave holographic reflection grid and a silicon photodiode array. The light from a blue light emitting diode 7 can be coupled in by way of the beam splitter 3. For the tests, the lamp type L1009 of the company Gateway, U.S.A. was used as incandescent lamp 1. It was operated at 3.5V and 450 mA. Besides this lamp type other vacuum and gas-filled incandescent lamps were used and also operated at various voltages. As the blue LED, the type ESB44510 provided by the company Oshino was used. The output signals of the photodiode array were supplied to a PC by way of an associated spectrometer electronic device and a PC insert card and were graphically represented by the PC and printed.

Between the beam splitter 2 and the first filter 3, the setup included a test tube 8, which however is of no importance for the tests represented herein. The tests were made without the use of a fluid or material to be tested. In actual practice, in this way, specifically in galvanic baths which contain numerous colored metal ions, those metal ions can be determined quantitatively when a sample is contained in the test tube 8.

Figure 2:
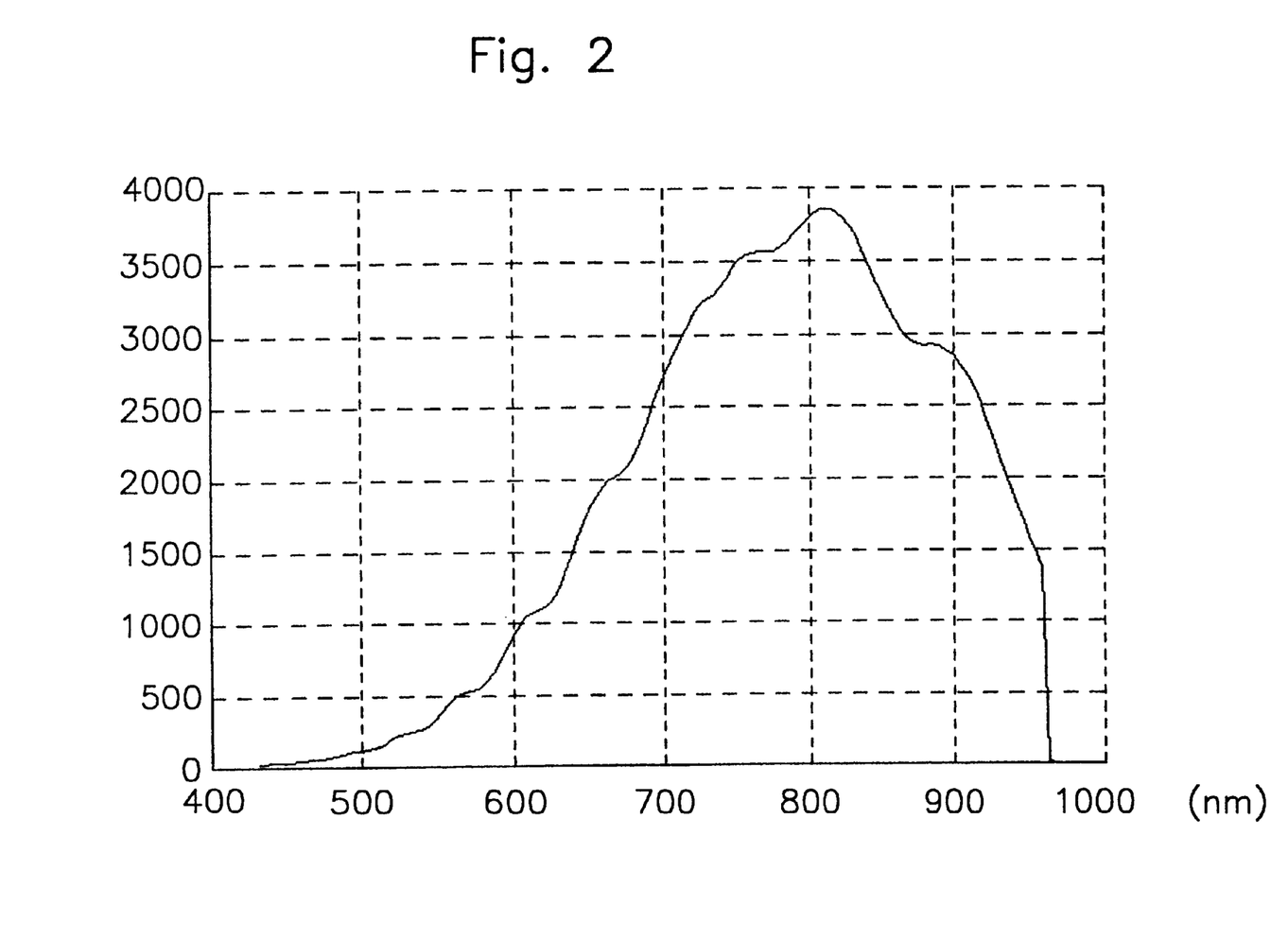
FIG. 2 shows the intensity distribution of an incandescent lamp over wave length.

FIG. 2 shows the intensity distribution as measured with only the incandescent lamp and no filters. This is the classic setup without any compensation. The sinus-shaped structures that are visible result from the particular spectrometer used and are unimportant in this connection. The measuring range of the spectrometer ends at 950 nm and the distribution curve reaches the zero value abruptly for that reason. Although the spectrometer is optimally timed for the maximum (max. 4096 counts) the intensity below 650 nm is already smaller than 50% of the maximum value and is under 500 nm so weak that accurate evaluations are not possible. As a result, the noise becomes high for wave lengths smaller than 500 nm. The well usable spectral range in which the intensity should not be much smaller than 50% of the maximum value is in this case consequently only 650 nm to 95 nm. Accordingly, compounds which absorb below 650 nm cannot be measured at all.

Figure 3:
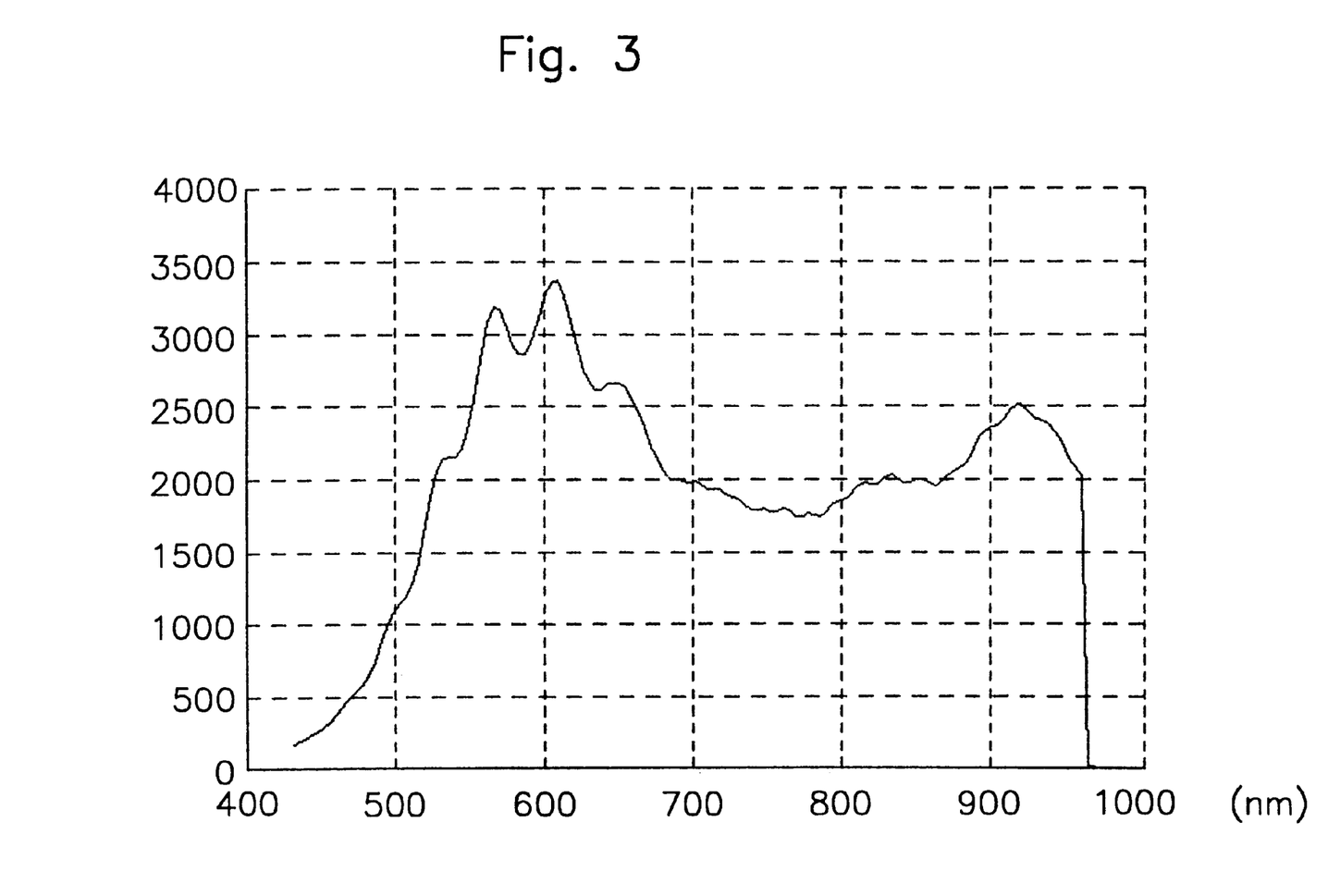
FIG. 3 shows the intensity distribution of an incandescent lamp with two correction filters.

In order to compensate for the large intensity drop toward the short wave end, one or two colored glass filters (Scholl) were inserted. FIG. 3 shows as example a measurement wherein as the filters 3, 4 two identical colored glass filters of the type BG26, 3 mm thick, were used. These commercially available filters have a transmission spectrum which permits more light to pass with decreasing wave length.

For this reason, the wave lengths are increased by 600 nm. The 50% measuring range is increased alone by this measure to between 520 nm and 950 nm.

The following observation is pointed out: if one of the two filters is physically displaced such that an outer edge of the filter intersects the optical axis formed by the incandescent lamp center point and the spectrometer inlet slot, an intensity distribution is obtained which, between 580 nm and 950 nm, deviates from a horizontal line only by ±/−10%. The reasons herefor are probably reflection effects at the filter edge. This relatively smooth curve however has the disadvantage that it depends highly on the adjustment of all the optical components.

If only one filter BS26 is used, a distribution curve similar to that shown in FIG. 2 is obtained, which however has a less steep decrease toward the short wave end and a lower 50% limit of 550 nm. An almost flat curve can be obtained with a filter having a thickness of 3 to 6 mm. The optimal thickness depends particularly on the voltage (below nominal voltage) at which the incandescent lamp is operated. If the incandescent lamp is operated for example at a voltage substantially below nominal voltage, the intensity maximum of the incandescent lamp moves further toward infrared and the blue part becomes weaker relative to the red part. In this case, a color filter of greater thickness would have to be selected as compensation. Then also the light intensity decreases, but this is not so important since this can be compensated for by increasing the integration time of the photodiode array.

Figure 4:
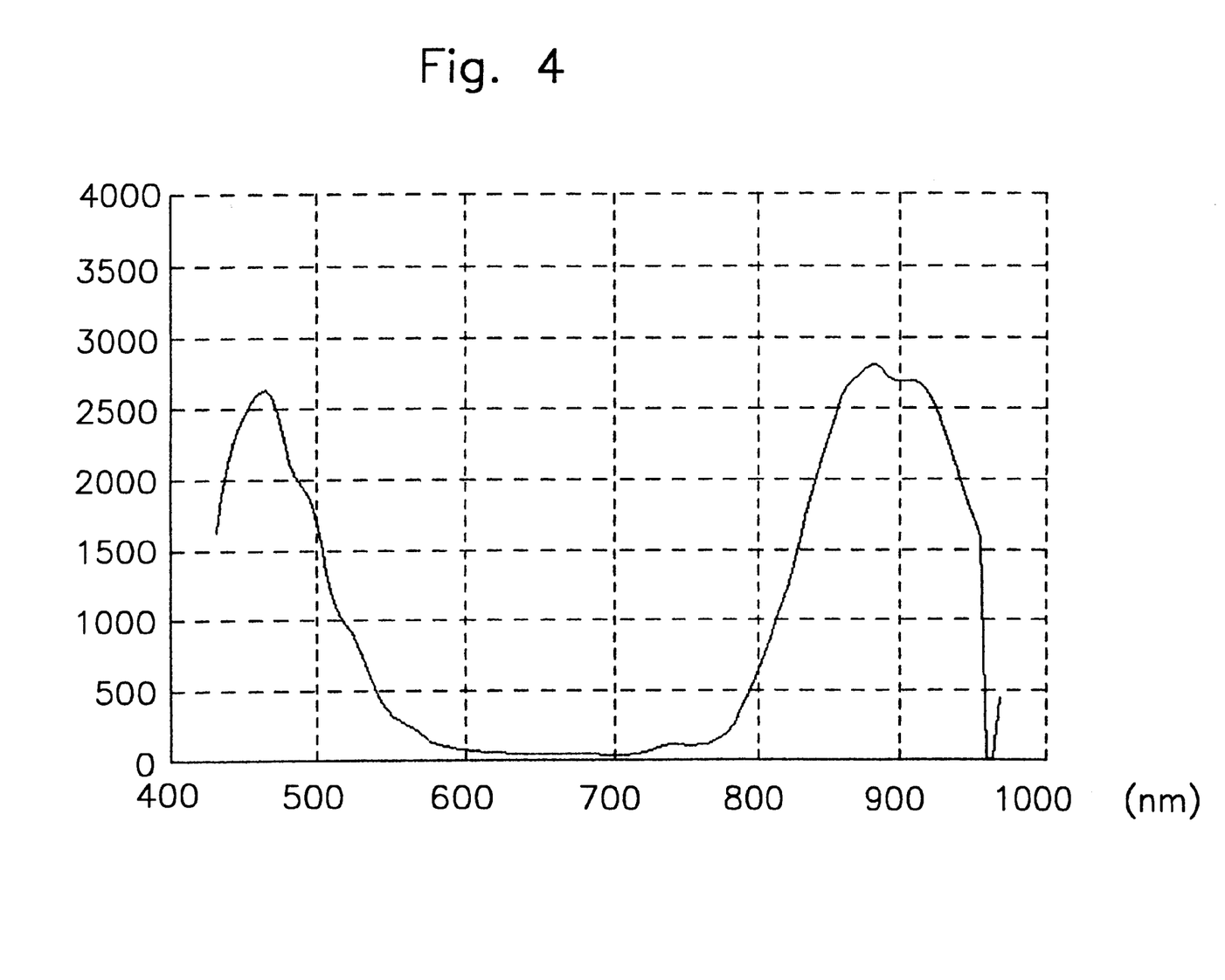
FIG. 4 shows the intensity distribution of a blue LED with two correction filters.

In order to expand the measuring range further toward blue instead of the incandescent lamp 1 the radiation of the blue light emitting diode 7 was coupled into the beam path by way of the beam splitter 2. The two BG26 filters 3, 4 were also installed. The result is shown in FIG. 4. The characteristic emission of the blue light emitting diode between the beginning of the measurement range of the spectrometer at 430 nm and 600 nm can easily be seen. The second peak with wave lengths greater than 780 nm results from the second order of the grid used in the spectrometer and shows that the light emitting diode emits light already from 390 nm which is in agreement with the manufacture's specification for the light emitting diode. For the suppression of this second order, an edge filter is used.

Figure 5:
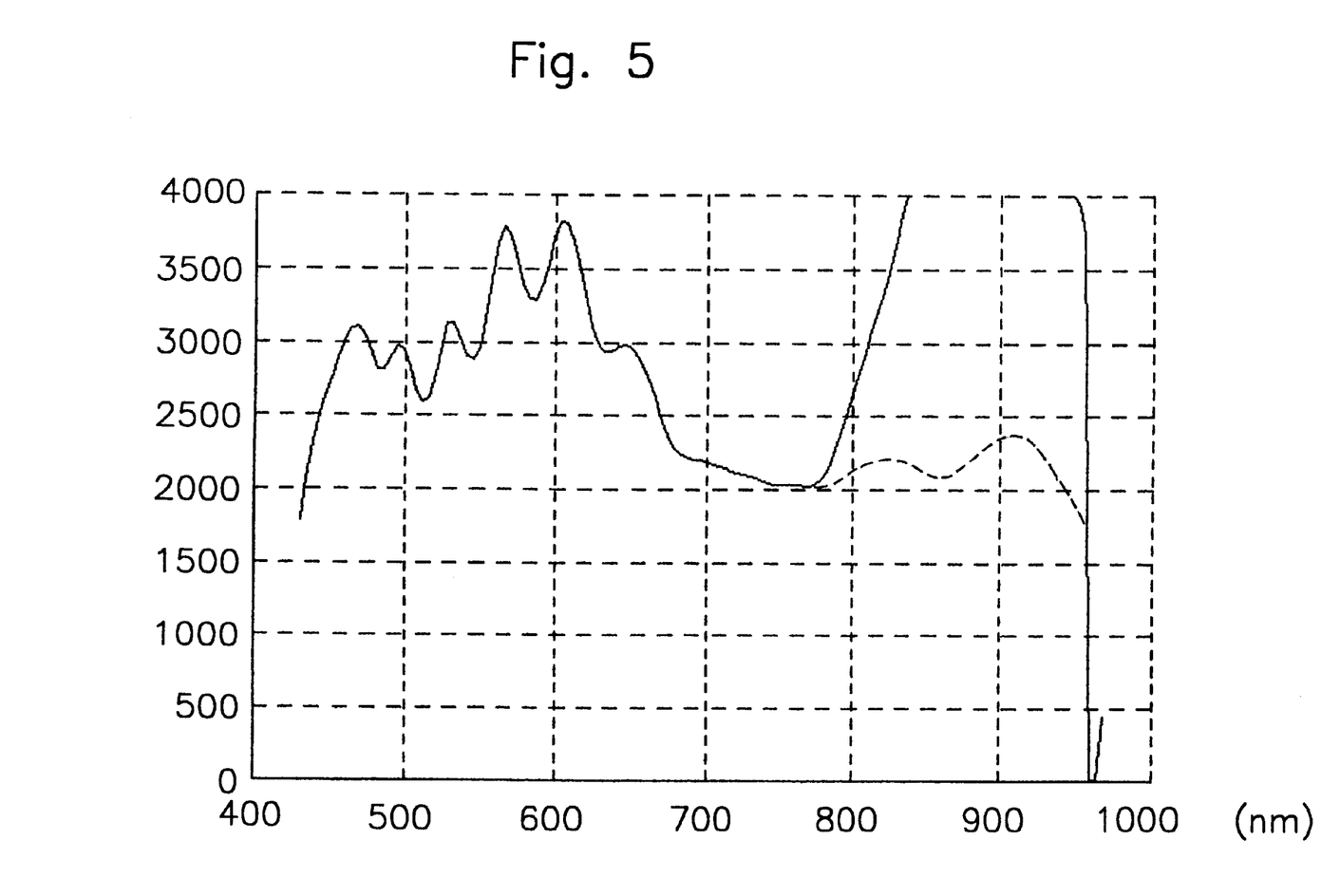
FIG. 5 shows the spectral intensity distribution of an arrangement with a blue LED, an incandescent lamp and two correction filters.

FIG. 5 shows the intensity spectrum as it is obtained with the setup according to FIG. 4, wherein however also the incandescent lamp 1 is energized. The overshooting beginning at 780 nm is the result of the second order of the LED radiation. With a suitable edge filter 5, the dashed curve distribution is obtained. The spectral measuring range (50%) of this arrangement is now expanded to between 440 nm and 950 nm.

Figure 6:
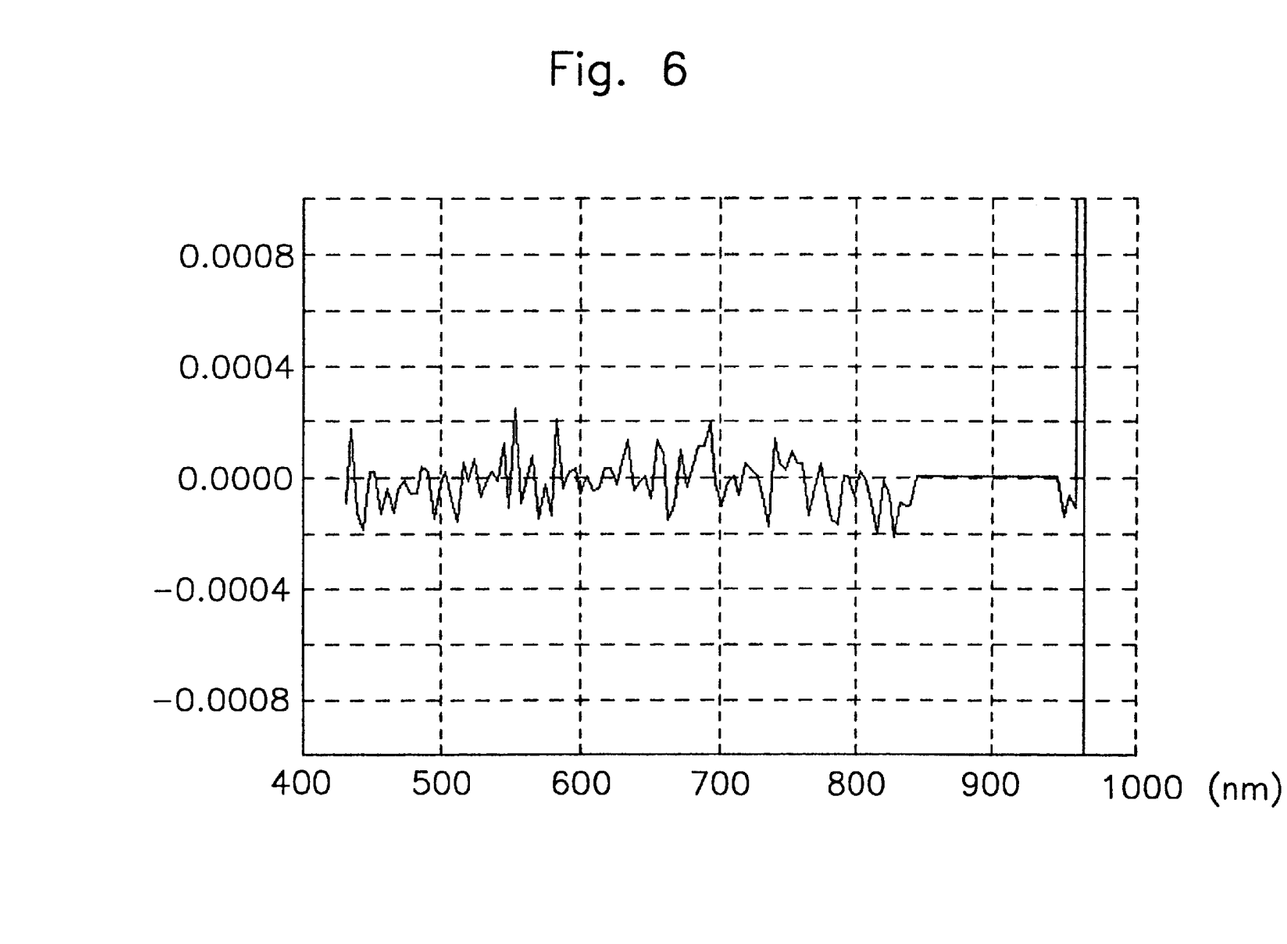
FIG. 6 shows the photometric noise of the arrangement.

For determining the photometric noise first such a measurement curve was stored in the PC and subsequent measurement curves were divided by the stored curve. These curves which are representative of the light permeability, or better the light transmission, are subjected to logarithm which is necessary for the absorption measurements. Such a typical curve is integrated in FIG. 6 in a highly spread representation for an averaging of 10 records, each 30 ms. The noise represented thereby is smaller than $\pm 2 \times 10^{-4}$ AU (absorbency units) over the whole spectral range, which corresponds to a smallest detectable light intensity variation of only 0.05%. The smooth range between 840 nm and 940 nm is cause by the overshooting resulting from the immovability of a suitable edge filter and can be disregarded.

Figure 7:
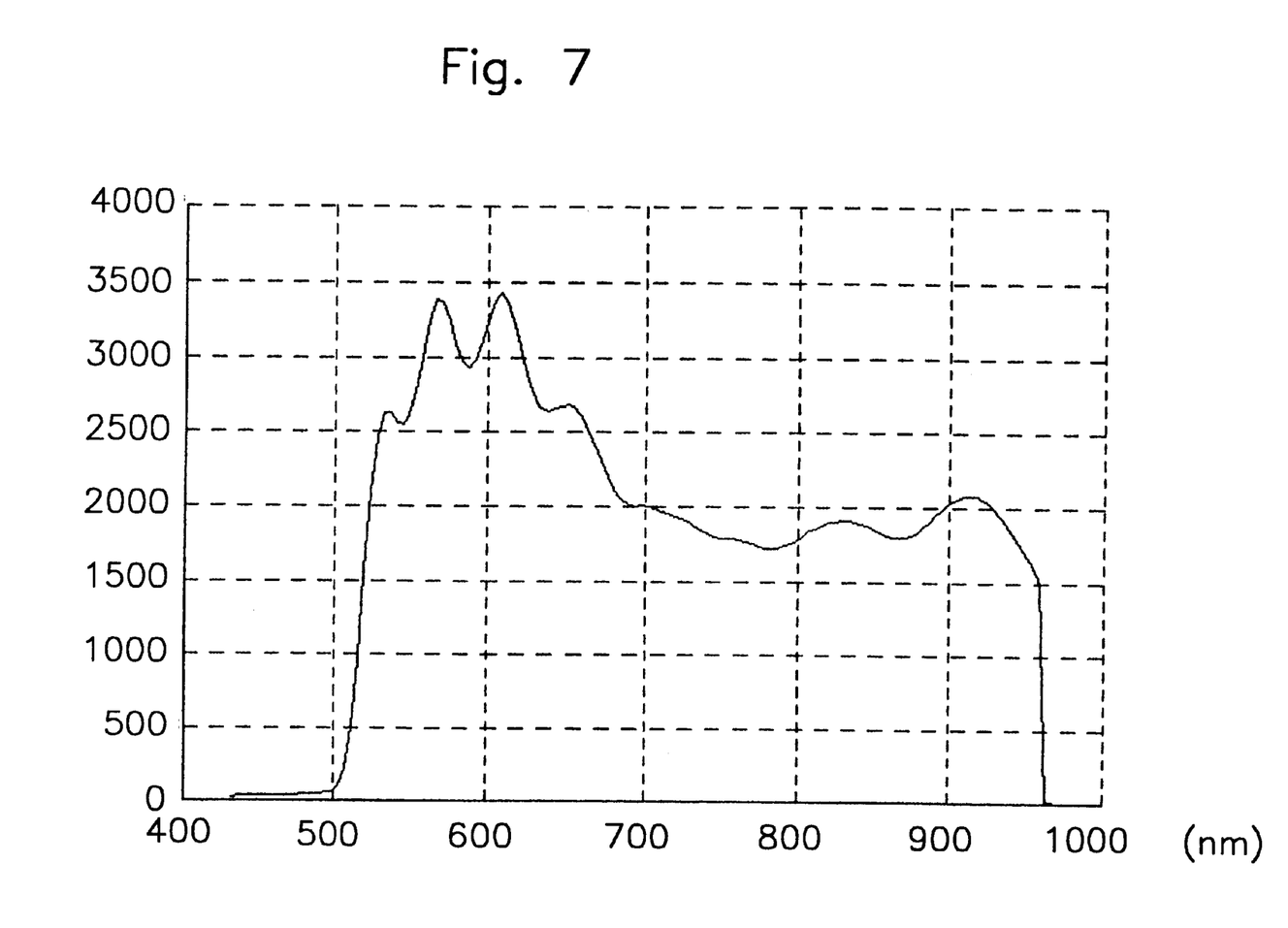
FIG. 7 shows the spectral intensity distribution of the arrangement according to the invention with a 515 nm edge filter for testing the stray light behavior.

For testing the stray light various filters with edges between 515 nm and 715 nm were inserted into the beam path as additional filters 5. As a worst case scenario, the results for the 515 nm filter are presented here, since it permits all the wavelengths from the long wave end down to 515 nm to pass. FIG. 7 shows the resulting spectrum. In the range below 450 nm where the edge filter safely does not permit any light to pass the measured count is only about 30. At an average signal, without 515 nm filter, of about 3000 counts the error light in this spectral range is consequently maximally 1%. It is pointed out that now of course also the 2nd order is not visible since it is suppressed by the 515 nm filter.

Without the arrangement according to the invention, the intensity would be at only 100 counts already at 500 nm (see FIG. 2) so that the error light would be 30%.

The invention can be realized in various embodiments. In the measurements described above an aluminum box was utilized which contained the spectrometer, the flow-through optical tube, the filters the incandescent lamp the light emitting diode and the the splitter whereby a good stability and a homogeneous temperature distribution is obtained. It has been found to be particularly advantageous if the incandescent lamp is disposed on the optical axis and the light emitting diode is disposed on an axis normal thereto. In this case, the intensities of the two light sources can be easily matched. However, it is conceivable that, with other types of lamps, an opposite arrangement would be more suitable. For example, a UV lamp such as a deuterium lamp could be arranged directly on the optical axis and the light of the incandescent lamp could be coupled in by way of the beam splitter. This would be advantageous because light losses at the quartz disc are affordable for the incandescent lamp since the long wave emission utilized therefrom meets silicon photodiodes which are sensitive for this particular range.

In another examined arrangement, the incandescent lamp and the light emitting diode were directly side-by-side on the optical axis so that a beam splitter is not necessary. Almost the same measuring results were obtained. However, there is more stray light and the adjustment is more critical.

The selection of the edge filter 5 for the elimination of the second order determines several possible spectral ranges: if only one incandescent lamp with colored glass filters 3, 4, but without light emitting diode and without edge filter 5 is employed, a spectral measurement range of 500 nm to 1000 nm can be realized in a simple manner. With an additional light emitting diode and an edge filter at 450 nm a range of 450 nm to 900 nm can be obtained which is particularly suitable for applications in galvanic baths. If no edge filter but an incandescent lamp and a light emitting diode are used, a range of 380 nm to 760 nm can be realized.

The colored glass filters and edge filters can be arranged at various locations within the beam path. Besides the positions shown in the embodiment the colored glass filter may be arranged directly in front of the incandescent lamp. In this way, the slight weakening of the light emitting diode light would be eliminated. The edge filter may be placed in front of the light emitting diode. In that case only the second order of the light emitting diode light would be suppressed whereas the second order of the incandescent lamp, which is only weak, would pass.

By a selection of certain filter thicknesses and filter type, the spectral distribution of the colored glass filter and the spectral sensitivity of all the optical components illuminated by the optical beam sources can be adjusted. This is true for example for different types of spectrometers with grids or prisms, for different detector arrays or for simple filter photometers consisting of band pass filters and individual detectors.

In another advantageous embodiment, the edge filter and the glass filter are formed directly on the array by vapor deposition.

The analysis system according to the invention may be used for the determination of gases, liquids, or solids which are colored in the visible spectral range.

An application field is, for example, the determination of the main ingredients or the contaminants in galvanic baths such as chemical nickel-, hard chromium-, chromatization- and noble metal baths.

What is claimed is:

1. An analysis system comprising at least two light sources providing light beams, means for combining the beams of the two light sources, a test tube arranged in the beam path, and a photodiode array spectrometer for sensing the light passing through said test tube, one of said light sources being an incandescent lamp which is operated at a voltage below its nominal voltage, and the second light source being a blue light emitting diode, and an optical filter arranged in the beam path between at least one of said light sources and said photodiode array spectrometer, said optical filter counteracting the intensity drop of the incandescent lamp and the sensitivity decrease of the photodiode array at the short wavelengths end.

2. An analysis system according to claim 1, wherein said test tube is adapted to receive liquid from galvanic baths such as chemical nickel-, hard chromium, chromatization and noble metal baths for measuring the main compounds and the contaminations contained therein.

* * * * *